United States Patent [19]
Oowada

[11] 3,991,622
[45] Nov. 16, 1976

[54] APPARATUS FOR MEASURING AIRTIGHTNESS OF SEALED BODY

[75] Inventor: Takeshi Oowada, Tokyo, Japan

[73] Assignee: Hisanao Aihara, Tokyo, Japan

[22] Filed: Oct. 25, 1974

[21] Appl. No.: 517,882

[30] Foreign Application Priority Data
Nov. 5, 1973 Japan.............................. 48-124269
Apr. 30, 1974 Japan................................ 49-48974

[52] U.S. Cl..................................... 73/49.3; 73/52
[51] Int. Cl.² .......................................... G01M 3/36
[58] Field of Search ............ 73/41, 45.2, 45.4, 49.2, 73/49.3, 52; 324/59

[56] References Cited
UNITED STATES PATENTS

| | | | |
|---|---|---|---|
| 2,908,881 | 10/1959 | Pitzer | 73/45.2 X |
| 3,343,404 | 9/1967 | La Rosa et al. | 73/49.3 |
| 3,355,932 | 12/1967 | Mulligan | 73/49.3 |
| 3,371,781 | 3/1968 | Armbruster et al. | 73/52 X |
| 3,454,869 | 7/1969 | Strauss et al. | 340/282 X |
| 3,837,215 | 9/1974 | Massage | 73/45.4 |
| 3,860,918 | 1/1975 | Cencel | 324/61 R UX |
| 3,861,206 | 1/1975 | Kawafune et al. | 73/141 R |

Primary Examiner—Richard C. Queisser
Assistant Examiner—John S. Appleman
Attorney, Agent, or Firm—Leydig, Voit, Osann, Mayer & Holt, Ltd.

[57] ABSTRACT

An apparatus for measuring airtightness of sealed bodies such as waterproof wristwatches. The apparatus comprises airtightly sealed container for an object to measure, means connected to the container for varying inner pressure thereof, and means for electrically detecting mechanical strain occurring at the surface of the object in the container when subjected to a varied pressure. The detection is performed, for precision purpose, by means of measurements of variations in reactance, electrostatic capacitance or the like responsive to changes in slight clearance between magnetic or conductive member engaged to a surface of the object and detecting coil or electrode opposed to the member due to the strain, or, for simpler determination purpose, by means of ON-OFF operation of relay contact means including stationary contact opposed to the object surface and movable contact engaged to the surface.

1 Claim, 10 Drawing Figures

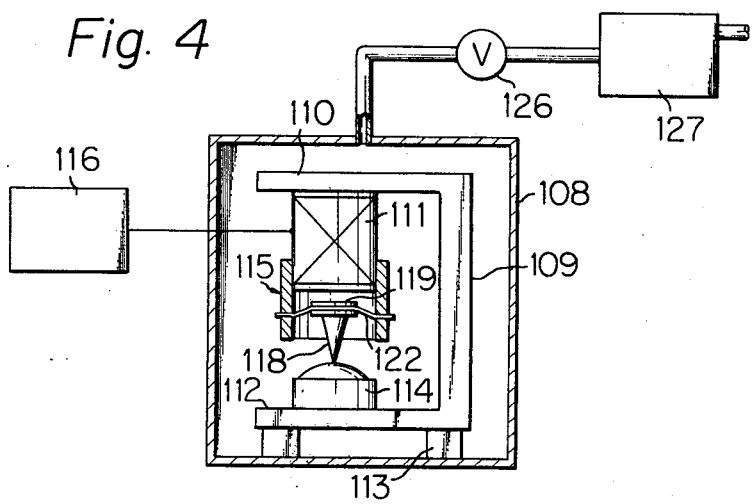
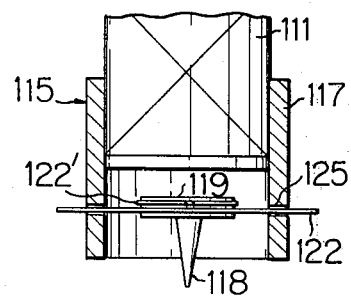
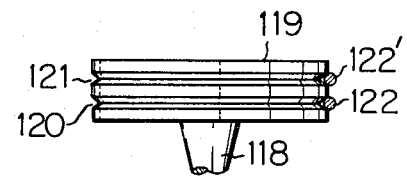
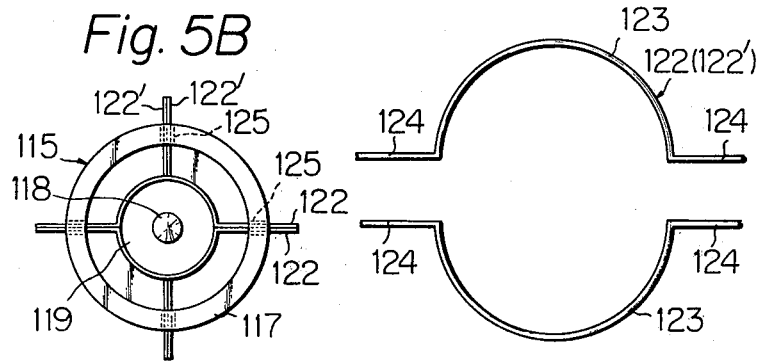

APPARATUS FOR MEASURING AIRTIGHTNESS OF SEALED BODY

This invention relates to an apparatus for measuring the airtightness of sealed bodies, in particular, such bodies as waterproof type wristwatches which require to be tightly sealed.

The airtightness of, for example, a waterproof type wristwatch (which shall be referred to simply as a watch hereinafter) has been conventionally determined by sinking the watch in water and seeing with eyes whether bubbles are generated from the watch or, alternatively, measured by means of variations in air pressure inside an airtight sealed chamber due to airtightnesses of the watch contained in the chamber. In the latter method, typically as shown in FIG. 1, a watch 2a of which airtightness is to be measured and a watch 2b which is known to be high in the airtightness of the same type and same volume as of said watch 2a to be measured are placed respectively in each of two independent airtightly sealed containers 1a and 1b, valves 3a and 3b are opened to elevate the atmospheric pressure inside the sealed containers with a compressor 4, then the valves 3a and 3b are closed and the pressures in the respective containers 1a and 1b are compared so that, in case the airtightness of the watch 2a to be measured is so low that compressed air penetrates little by little into the watch (this state shall be referred to as a "small leak" hereinafter), the pressure in the container 1a will reduce to be lower than the pressure in the container 1b. This phenomenon, that is, the difference in the inner pressure will be detected with a pressure difference detector 7 to detect the small leak. On the other hand, in case the airtightness of the watch 2a is very low (this shall be referred to as a "large leak" hereinafter), the inside pressure of the watch 2a will be also elevated already in the initial stage of the pressurizing and, even if the valves 3a and 3b are closed, no pressure difference will be detected in the pressure difference detector 7. In such case, valves 5a and 5b will be opened to feed the air in the respective containers 1a and 1b into associated sealed containers 6a and 6b with the containers 1a and 1b, respectively. As long as the sealed containers 1a and 1b are mutually of the same volume and the associated containers 6a and 6b are also of the same volume, the sealed container associated with the container 1a in which the watch 2a of the large leak is placed will be higher in the pressure by the volume of air that having penetrated into the watch and, thus, this pressure difference is detected with the pressure difference detector 7, and whether there is a large leak from said watch 2a will be able to be checked.

Thus, in the conventional measuring methods, unless the watch to be measured is sunk in water or a standard watch having no leak and of exactly the same type as of the watch to be measured is prepared, the large leak will not be able to be measured and, further, the latter measurement requires a very troublesome operation and time. In the measurements by means of the pressure difference detector, further, the fluctuation of the atmospheric pressure due to the deformation of the sealed container and the temperature variation fundamentally brings errors into the measured value. Particularly, in the water sinking method, water is likely to penetrate into the watch and it is difficult to detect a small leak. The present invention has been suggested to remove the above mentioned defects of the conventional methods.

A main object of the present invention is, therefore, to provide a measuring apparatus with which both small and large leaks can be measured only with the object to be measured, without sinking it in water nor requiring such an additional object to be compared as a standard watch.

Another object of the present invention is to provide a measuring apparatus with which the measuring operation is made easy and possible errors due to the temperature fluctuation or the deformation of the sealed container are made few.

The present invention shall now be explained in the followings with reference to certain preferred embodiments illustrated in accompanying drawings, in which:

FIG. 1 shows schematically an exemplary one of the conventional measuring apparatuses with sealed containers in section;

FIG. 2 schematically shows an embodiment of the apparatus of the present invention with sealed container similarly in section;

FIG. 4 shows also schematically another embodiment of the present invention with a part in section;

FIGS. 5A through 5D are detailed views showing structure and arrangement of a senser used in the embodiment of FIG. 4.

Figure 1:
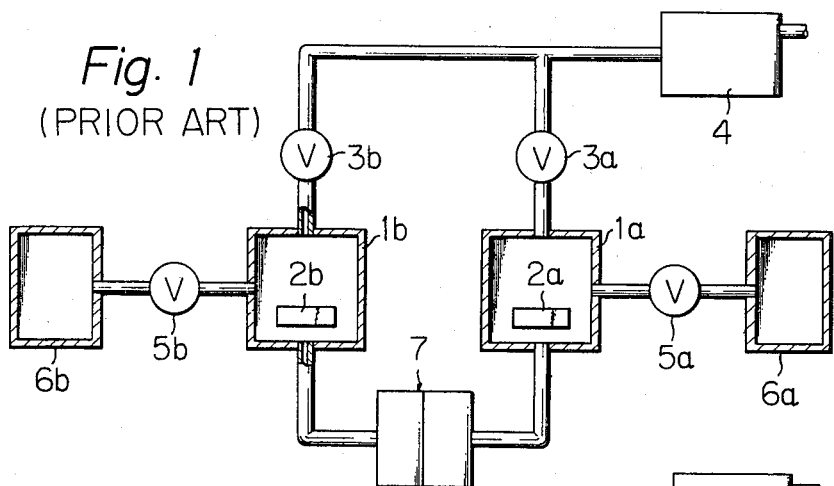
Figure 2:
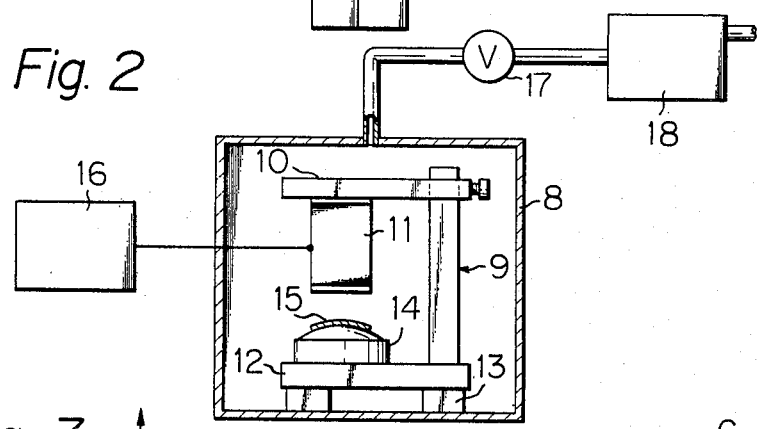

Referring first to FIG. 2, 8 is an airtightly sealed container, in which a substantially U-shaped supporting stand 9 is housed as fixed thereto through legs 13, a detecting coil 11 is fitted to the upper arm 10 preferably adjustably mounted to vertical arm of the stand 9 and such an object to be measured as, for example, a watch is placed on the other arm 12 of the stand 9 so as to oppose to the lower surface of the coil 11 through a slight clearance. A film 15 of a magnetic material is applied or pasted intimately to the surface of a windshield glass, which may be of any other material than glass, that is, the surface may be of other part of the watch 14. The detecting coil 11 is connected to a reactance measuring apparatus 16 including a current source. Further, the airtight sealed container 8 is connected with a compressor or an exhaust pump 18 through a valve 17.

Figure 3:
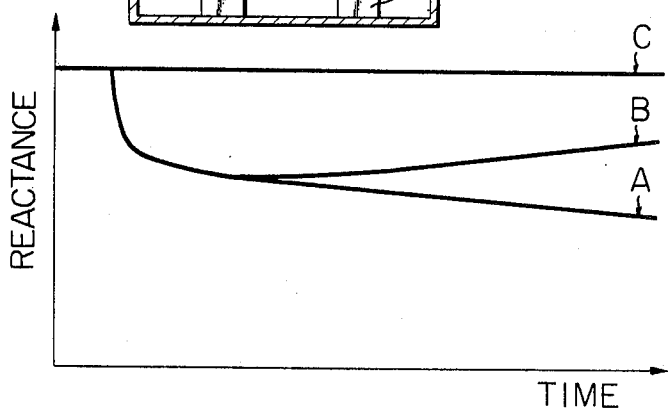
FIG. 3 is a reactance characteristic diagram of measurements with the apparatus shown in FIG. 2.

With the above arrangement, the valve 17 is opened so that, for example, the pressure in the sealed container 8 will be elevated by the pressurized air from the compressor 18. If there is no large leak in the watch 14, the elevated pressure causes the windshield glass to be deformed in the direction of reducing the thickness between the glass and back lid of the watch and consequently the clearance between the detecting coil 11 and the magnetic film 15 on the watch 14 will vary. Therefore, if an alternating current is being flowed through the coil 11 and the variation of its reactance is measured with the measuring apparatus 16, as the reactance will vary with the lapse of time, it is possible to detect whether there is even any small leak in the airtightness of the watch. In FIG. 3, there are shown examples of the reactance variations. The time is taken on the abscissa and the reactance is taken on the ordinate of the diagram of FIG. 3 to show the state of the variation. In the diagram, the curve A shows a state that there is no leak, the curve B shows a state that there is a small leak and the curve C shows a state that there is a large leak.

That is, if, as a result of the above test, there is a large leak in the watch 14, the air pressure inside the watch 14 will be the same as that in the pressurized sealed container 8 and the windshield glass surface will not be deformed, so the clearance between the magnetic film 15 on the watch and the coil 11 will not vary and, therefore, no reactance variation will appear with the lapse of time.

In another embodiment of the present invention shown in FIG. 4, 108 is a sealed container, 109 is a supporting stand, 110 is an upper arm of the stand, 111 is a detecting coil, 112 is lower arm of the stand, 113 are support legs for the stand 109, 114 is an object to be measured, 116 is a reactance measuring apparatus including a current source, 126 is a valve and 127 is a compressor or exhausting device and these components are the same as those in the embodiment of FIG. 2, except that the magnetic material film is not provided on the surface of the object 114 to be measured whereas the detecting coil 111 is provided at the lower surface with a sensor 115 having such structure as will be shown in detail in FIGS. 5A through 5D. The detecting coil 111 is provided at the lower end with a sensor 115 of, for example, a cylindrical body 117 and a disk body 119 having a detecting needle 118 extending downward is supported in the inner space of the body 117 so as to be freely movable with less resistance in the vertical direction and spaced from the lower surface of the coil 111 (see FIG. 5A). In the illustrated embodiment, two parallel grooves 120 and 121 are made on the periphery of the disk body (see FIG. 5C), and two pairs 122, 122' of resilient wires of preferably a piano wire are set around the disk respectively in crosswise directions (see FIG. 5B) in such manner that a semicircular section 123 (FIG. 5D) of each wire of the respective pairs 122, 122' will be fitted in the respective grooves 120, 121 and both end extensions 124 of each wire (FIG. 5D) will be inserted in and project out of holes 125 made on the peripheral wall of the senser body 117 so that the disk body 119 with the needle 118 pointing downward is resiliently suspended by the pairs of wires. The object 114 to be measured is stably placed on the lower arm 112 of the stand 109 so that its upper surface will be in contact with the tip of the needle 118 so as to slightly lift the disk body 119 upward.

The operation of this embodiment shown in FIG. 4 is substantially the same as in the case of FIG. 2. For example, as compressed air is fed into the airtight container 108, the upper surface of the object to be measured will be deformed in response to the airtightness of the object and, therefore, the needle 118 will move vertically causing the variation in the clearance between the coil and the disk. This variation is to be detected by the detecting coil 111 as the variation in the reactance of the coil current.

Figure 6:
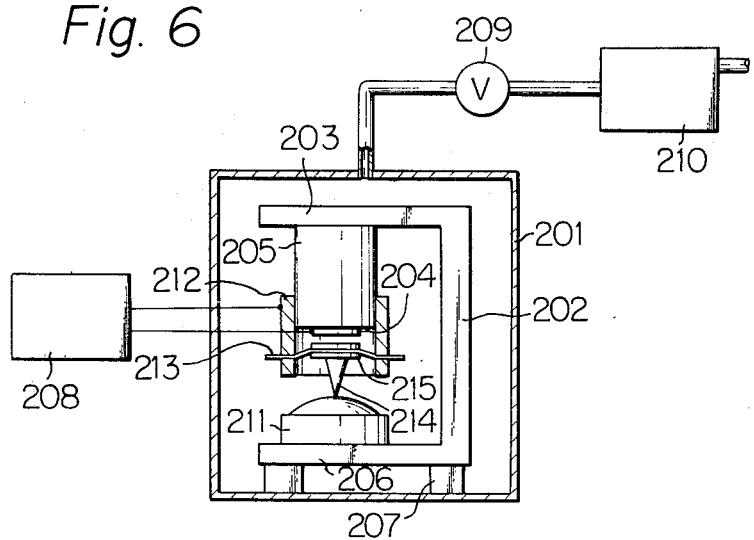
FIGS. 6 and 7 are similar views to FIGS. 2 and 4, showing other embodiments of the present invention.

Instead of measuring the reactance variation as in the above embodiment, it is also possible to perform the measurement with the same effect by measuring the variation in electrostatic capacitance caused by the clearance variation responsive to the vertical shift of the disk. FIG. 6 shows another embodiment using this principle according to the present invention. In FIG. 6, 201 is an airtight sealed container, 202 is a supporting stand, 203 is an upper arm of the stand, 204 is an electrostatic electrode fixed to the lower end surface of an electrically insulative member 205 fixed to the arm 203, 206 is a lower arm of the stand, 207 are fixing legs for the stand, 211 is an object to be measured, 208 is an electrostatic capacitance measuring device including a current source, a terminal of which device is connected to the electrode 204, 209 is a valve, 210 is an air compressor or exhausting device, 212 is an electrically conductive senser body fixed to the member 205 and connected to the other terminal of the measuring device 208, 214 is a detecting needle extending downward from a disk 215 made of an electrically conductive material, and 213 are piano wires supporting the disk 215 and electrically connecting the disk to the senser body 212. Thus the structure of this embodiment is substantially the same with that of the foregoing embodiment of FIGS. 4 and 5, except that the electrostatic electrode 204 is provided in place of the detecting coil 111 in the embodiment of FIG. 4, the senser body 205 and disk 215 are electrically conductive specifically in the present instance, and the capacitance measuring device 208 in place of the reactance measuring device is connected to the members 205 and 215. In operation, the airtightness of the object 211 is determined by measuring the electrostatic capacitance between the electrode 204 and the disk 215, which is caused to vary depending on the degree of the airtightness of the object, and the same results and effects as in the case of measuring the reactance variation will be obtained.

Figure 7:
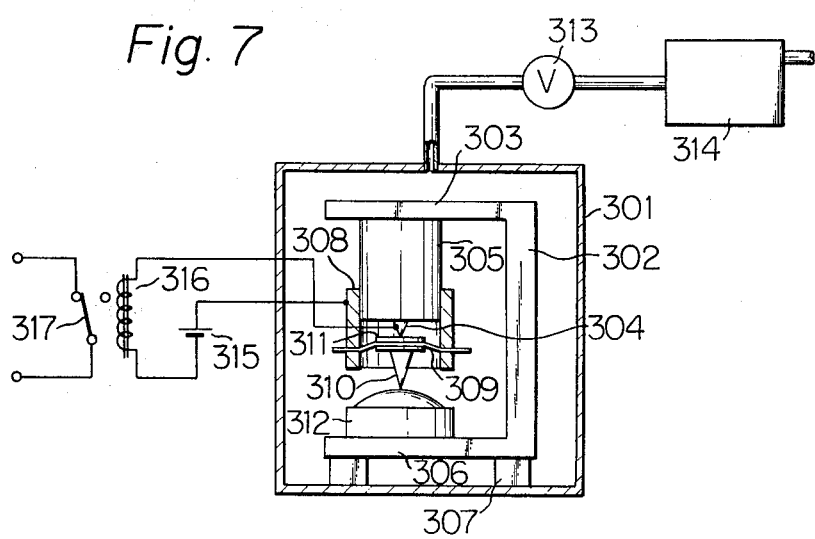

FIG. 7 shows a further embodiment of the present invention, which is most suitable for use in the case of detecting only any large leak of the object to be measured. For this purpose, the airtightness is measured in the form of a relay operation in this embodiment and, except that certain means therefor are provided in the apparatus, the structure and arrangement of the respective components of the apparatus shown in FIG. 7 are sustantially the same as those in FIG. 6. Referring to FIG. 7, 301 is an airtight sealed container, 302 is a supporting stand, 303 is an upper arm of the stand, 304 is a stationary electric contact point secured to the lower surface of an electrically insulative member 305 fixed at its upper surface to the arm 303, 306 is the lower arm of the stand at which the stand is mounted to an inner wall of the container 301 through support legs 307, 308 is a senser body made of an electrically conductive material in a cylindrical shape and secured at the upper part to the insulative member 305, 309 are piano wires for supporting a detecting needle 310 and an associated disk member 311 made of an electrically conductive material as suspended within the senser body 308 in the same manner as disclosed with reference to FIG. 5, and 312 is such an object to be measured as a waterproof watch placed on the lower arm 306 so that the disk 311 will be lifted up by the object 312 through the needle 310 so as to be electrically in contact with the stationary contact point 304. 313 is a valve and 314 is an air compressor (or exhausting device) communicated with the inside of the container 301 through the valve 313. 315 is an electric power source connected at an end to the senser body 308 and at the other end to the stationary contact point 304 through a relay coil 316, and 317 is a relay contact to be operated by the coil 316.

Thus the difference of the present embodiment from that of FIG. 6 is that the senser body 308 including the disk 311 and the stationary contact point 304 are forming an electric ON-OFF structure in which the disk 311 is acting as a movable contact, and the relay coil 316 including the current source 315 is provided in place of the capacitance detector 208 in the case of FIG. 6.

In the operation, the stationary contact 304 and the disk 311 are kept, in the present instance, in contact with each other by means of the object 312 and an electric current is made to flow through the ON-OFF structure before a pressurized air in the present instance is applied to the object to be measured.

It should be noted here that when an air exhausting device is used instead of the compressor 314 the contacts 304 and 311 should be initially kept away from each other by a slight clearance.

If there is no large leak, that is, the airtightness is high or slightly low in the object to be measured in the above state, the object will be deformed by the applied pressure so as to disconnect the contact 304 from the disk 311, thereby the current flowing through the coil 316 will be interrupted to switch over the contact 317 but, if there is a large leak, the current will not be interrupted. Thus it is possible to determine whether there is a large leak or not in the object to be measured, by means of, for example, an indicator connected to the relay contact 317 so as to be responsive simply to the ON or OFF state between the stationary contact 304 and the movable contact 311.

According to the present invention, as described above, in the measurement, the variation of the mechanical deformation or strain of the surface of the object to be measured is electrically detected to thereby detect any large or small leak in the airtight structure of the object. Therefore, the measurement is very precisely and accurately obtained and yet in a very simple and easy manner, there is no such need as of dipping the object into water so that the object is not damaged, and no sample for the standard is required so that the apparatus can be made more compact.

What is claimed is:

1. An apparatus for measuring airtightness of sealed bodies comprising an airtight sealed container for accommodating an object the airtightness of which is to be measured, a support stand contained within said container and upon which said object is positionable, means connected to said container for varying the air pressure inside said container, electromagnetic detecting means comprising a detecting coil fixed to the upper part of said support stand and a sensor disk made of magnetizable material and having a flat surface, an electric source for supplying alternating current to said coil, a cylindrical body secured concentrically to said detecting coil and formed with a plurality of holes on the inside wall thereof, means for resiliently supporting said disk in said cylindrical body with said flat disk surface maintained in a spaced relation with said coil such that said disk and coil mutually have an electromagnetic influence on each other when an alternating current is fed to said coil, said disk body being formed with a plurality of annular grooves about its periphery and a detecting needle extending out from the center of the side opposite said flat surface for contacting a surface of an object positioned on said support stand, said resilient disk supporting means including a plurality of pairs of resilient wires respectively having an arcuate central part and straight extensions at both ends, said wires being fitted in said annular grooves of the disk body at said arcuate part and inserted in said holes of the cylindrical body at said extensions, said surface of the object to be measured being deformable in response to a variation in air pressure within said container, and means connected to said coil for measuring reactance variations in the alternating current fed to said coil occurring upon a shift of said disk in response to a deformation of the object when the air pressure inside said container is varied whereby a determination of the airtightness of the object may be made.

* * * * *